(12) United States Patent
Stiglich et al.

(10) Patent No.: US 11,027,799 B2
(45) Date of Patent: Jun. 8, 2021

(54) SYSTEMS AND METHODS FOR 3-DIMENSIONAL SCANNING FOR DRYDOCKING

(71) Applicant: DM Consulting, Inc., San Diego, CA (US)

(72) Inventors: Alexander Edward Stiglich, San Diego, CA (US); Joseph Francis Stiglich, San Diego, CA (US)

(73) Assignee: DM Consulting, Inc., San Diego, CA (US)

( * ) Notice: Subject to any disclaimer, the term of this patent is extended or adjusted under 35 U.S.C. 154(b) by 0 days.

(21) Appl. No.: 17/019,095

(22) Filed: Sep. 11, 2020

(65) Prior Publication Data

US 2021/0078681 A1 Mar. 18, 2021

Related U.S. Application Data

(60) Provisional application No. 62/899,670, filed on Sep. 12, 2019.

(51) Int. Cl.
  *B63C 5/04* (2006.01)
  *B63C 1/08* (2006.01)
  (Continued)

(52) U.S. Cl.
  CPC .............. *B63B 79/30* (2020.01); *B63B 79/20* (2020.01); *B63C 1/00* (2013.01); *B63C 1/06* (2013.01); *G06T 17/10* (2013.01)

(58) Field of Classification Search
  CPC ......... B63B 79/00; B63B 79/10; B63B 79/20; B63B 79/30; B63C 1/00; B63C 1/02; B63C 5/00; G06T 17/10
  (Continued)

(56) References Cited

U.S. PATENT DOCUMENTS 9,153,079 B1 * 10/2015 Wood ..................... G06Q 40/08
10,166,672 B1    1/2019 Lotz
(Continued)

FOREIGN PATENT DOCUMENTS

| CN | 101501487 B | 9/2013 |
|---|---|---|
| CN | 104142195 B | 11/2016 |
| JP | 2007285730 A | 11/2007 |

OTHER PUBLICATIONS

Ahmed et al., "Boat Survey Using Photogrammetry Method", International review of Mechanical Engineering, 6(7): 1643-1647, Oct. 2012.
(Continued)

*Primary Examiner* — Daniel V Venne
(74) *Attorney, Agent, or Firm* — Knobbe, Martens, Olson and Bear, LLP

(57) ABSTRACT

A method comprising scanning at least one portion a hull of a vessel positioned below a waterline while the vessel is floating in water. The method further comprises generating multi-dimensional scans of the at least one portion of the hull based on data acquired during the scanning, generating a 3-dimensional (3D) model of the at least one portion of the hull, analyzing the 3D model to identify one or more features of the hull of the vessel below the waterline, generating docking information for drydocking the vessel based on the one or more features of the hull, and identifying, based on the generated docking information, a docking plan for supporting the vessel when the vessel is supported out of the water. The method further comprises outputting instructions to dry dock the vessel.

20 Claims, 13 Drawing Sheets

(51) Int. Cl.
  *B63C 7/00* (2006.01)
  *B63C 1/02* (2006.01)
  *B63B 79/30* (2020.01)
  *B63C 1/00* (2006.01)
  *G06T 17/10* (2006.01)
  *B63B 79/20* (2020.01)
  *B63C 1/06* (2006.01)

(58) Field of Classification Search
  USPC .................. 114/44, 45; 405/4, 7; 700/1, 90
  See application file for complete search history.

(56) References Cited

U.S. PATENT DOCUMENTS

| 10,197,674 B2 | 2/2019 | Thompson et al. |
| 2013/0204543 A1 | 8/2013 | Pettersson et al. |
| 2015/0269792 A1* | 9/2015 | Wood ................. G06Q 30/0283 701/31.5 |
| 2017/0021446 A1 | 1/2017 | Maev et al. |

OTHER PUBLICATIONS http://www.teledynemarine.com/blueview-3d-multibeam-scanning-sonar?ProductLineID=5, 3D Multibeam Scanning Sonar—BlueView, printed Mar. 8, 2021.
www.deeptrekker.com/products/utility-crawlers/dt640-mag-utility-crawler, printed Mar. 8, 2021.
"3D scanning" Wikipedia.com. https://en.wikipedia.org/wiki/3D_scanning#Reconstruction, printed Feb. 14, 2021.
"3D scanning" Wikipedia.com. https://en.wikipedia.org/wiki/3D_scanning#Technology, printed Feb. 14, 2021.
MIL-STD 1625 Safety Certification Program for Drydocking Facilities and Shipbuilding Ways for U.S. National, Aug. 27, 2009.
NSTM Chapter 997 Docking Instructions and Routine Work in Dry Dock, third revision, Nov. 25, 1996.

* cited by examiner

SYSTEMS AND METHODS FOR 3-DIMENSIONAL SCANNING FOR DRYDOCKING

CROSS-REFERENCE TO RELATED APPLICATION

This application claims the benefit of priority to U.S. Provisional application No. 62/899,670 filed Sep. 12, 2019, the entire contents of which are hereby incorporated by referenced herein for all purposes. Any and all applications for which a foreign or domestic priority claim is identified in the Application Data Sheet as filed with the present application are hereby incorporated by reference under 37 CFR 1.57.

BACKGROUND

Field

This disclosure relates generally to drydocking systems and methods, and more particularly to systems and methods for using 3-dimensional scanning to provide information to improve drydocking, for example, of vessels.

Description of Related Art

Drydocking is the process of utilizing a dry dock in order to place a water vessel on dry land. A dry dock is a basin or structure (fixed or mobile) that can be flooded with water or maneuvered around a vessel to allow access to a load (for example, the water vessel). The water in the dry dock is then drained, or the load is lifted out of the water to allow the load to come to a rest on a dry platform. Drydocking can be used in the construction, maintenance, and repair of ships, boats, and other water vessels.

Generally, drydocking may involve a docking plan. The docking plan outlines how the drydocking of the vessel takes place, including where blocks are placed to support the water vessel when the water vessel is dry docked. However, docking plans may not exist for all water vessels or may be outdated and may not account for a current state for the water vessel's hull. Current systems and methods for drydocking may be insufficient to account for irregularities in the water vessel's hull and, thus, may present problems with respect to block placement, block fit, etc., when drydocking the vessel.

There is a desire for improved systems and methods that provide for accurately and safely drydocking a water vessel, even without a docking plan.

BRIEF DESCRIPTION OF THE DRAWINGS

The aspects described herein, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
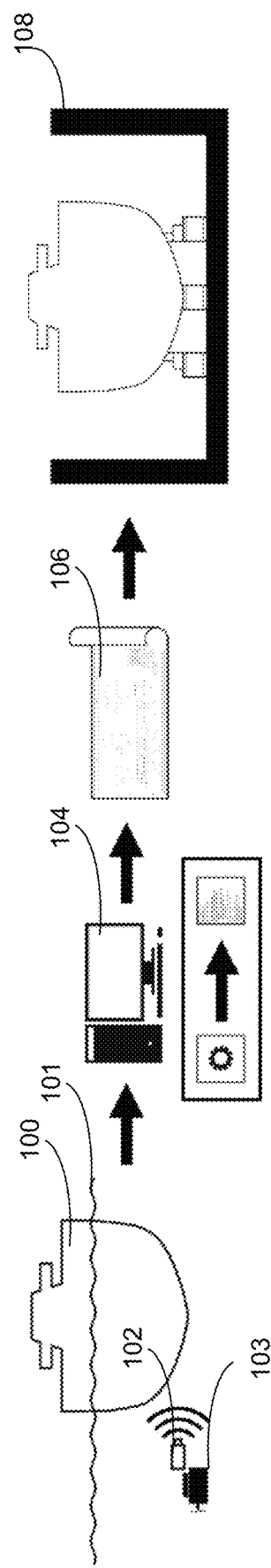
FIG. 1 is a block diagram of a process for 3D scanning and drydocking a water vessel.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Drydocking is a process for maintaining and/or servicing particular water vessels. However, various problems may exist or arise when drydocking the water vessel. For example, if the water vessel has an unknown hull shape, the corresponding docking plan may be of poor quality or there might not be any plan at all. Alternatively, regardless of the hull shape, the hull of the water vessel may have one or more unknown projections (for example, damaged areas, scientific equipment, propellers, growths, navigation equipment, control equipment, and so forth). In some embodiments, the location, quantity, position, and/or size of the projections on the hull of the water vessel could change such that previous docking plans can be made out of date. These projections may interfere with supports for the water vessel being dry docked. When the size and/or location of the projection(s) is not well recorded, not recorded at all, or can change over time, drydocking the vessel can be difficult and/or unsafe. Additionally, and/or alternatively, it can be desirable for water vessels with wooden hulls to be supported (when dry docked) similar to how the water vessels are supported in water and/or it can be desirable for vessels with hulls that developed a hog or sag to be supported in customized ways to reduce stress/strain on the vessel as it sits on blocks when supported.

Aspects of this disclosure related to 3-dimensional (3D) scanning for drydocking. A multi-dimensional scan can gather information about a vessel. The gathered information can be processed to create a 3D model. Useable and relevant information can be extracted for drydocking. Then preparations can be made for safe drydocking. The disclosed technology can be relatively inexpensive to implement and reduce uncertainty and/or risk in drydocking.

A 3D scan of a vessel can be generated before drydocking to accurately capture the vessel's condition and specifications. This can involve underwater 3D scanning. Some of the complications that come with underwater 3D scanning might change which technology or techniques to use for the 3D scan. Complications that come with 3D scanning underwater include one or more of (a) a vessel might be bobbing (pitching, rolling, yawing, heaving, surging, and/or swaying), or bending (bending, twisting, expanding and/or contracting), depending on the calmness of the water, (b) low visibility conditions at various frequencies of light, (c) hull abnormalities; ice, sea growth, damage, or (d) sensitive equipment on a vessel that should not be exposed to signal interference. The methods for underwater 3D scanning that could be utilized include but are not limited to one or more of:

Photogrammetry or Stereo IR Depth Cameras—These technologies may not necessarily be affected by the slight movement of a floating vessel, as captured data can be patched together despite recording where the sensor is through the normal way of processing the data. Photogrammetry might have trouble with the waterline, and corresponding data might need case by case adjustment due to the varying nature of the surface, and reflectivity, of the waterline, which can confuse the software attempting to patch the captured data together. Specific camera settings and lighting can help for low visibility—normal underwater filmography adjustments. These techniques can help detect hull abnormalities, positions and extent of ice, sea growth, and damage. These techniques are also non-invasive to sensitive equipment.
  3D Multi-beam Sonar or LiDAR (Laser Scanning)—These technologies may involve capturing an unmoving vessel from a moving platform, using inertial/tilt sensor data from the platform. Capturing a moving target may require additional calibration or special conditions depending on the severity of the ship's movement in the water. The key is making sure the sensors' position/tilt information is given relative to the vessel being scanned. This can be accomplished by adding a triangulation positioning system on the vessel, capturing the minute vessel movements and using that data to compensate for the inaccuracies, or some other method of compensation. These technologies can work in low visibility. These technologies point out the general presence of abnormalities. Sensitive equipment must be considered before using these technologies.
  3D sonar and/or ultrasonic waves can capture data without visibility.
  Ultrasonic sensors may manually and autonomously inspect hull thickness underwater.
  Hull Inspection System.
  A multi-beam sensor rig, combining high resolution, low range capability multi-beam sonar with motion sensors and software for motion compensation.
  IR/RGB cameras which can quickly capture surface geometry up to a desired resolution by quickly passing over.
  Magnetic Robot Crawler, which can attach to the hull of a steel ship and operate above and below water.

The method of capture could include, but is not limited to, one or more sensors operated by a remotely operated vehicle (ROV) or other robotic device(s), diver(s) with sensor(s), rope(s) or pole(s) with sensor(s) navigated along or under the vessel from top-side of the vessel or assisted by another vessel. In some embodiments, stationary sensor(s) could be used while navigating the vessel over the sensor(s).

Additional considerations include:
  Projections protruding from the hull, openings and suctions that should be avoided
  Range for sensors, size of data/processing time
  A combination of underwater and above water information capture can give additional useful information, but may require separate techniques that may need to be carefully overlaid, and may require interpolation between data points (especially around the water line, where it could be difficult to capture)

Additional data that can be capture during the 3D scan includes:
  Water salinity
  Hull strength points; including but not limited to longitudinal and transverse strength members Other technologies can be utilized, including but not limited to: ultra-sounding the hull, exterior/interior testing or survey. In some embodiments, the hull information may be available from general layout or other vessel drawings or other pre-existing information or records.

The data from 3D scanning with the one or more sensors with one or more technologies can be processed. Consideration should be made for accurately noting the waterline. Data can/should be supplemented by any other information available including docking plans, general arrangements, or other vessel drawings. The goal is to utilize the captured data/known data to create a usable depiction of a vessel. This depiction can be in the form of a 3D model of faces, 3D plotted points, 3D mesh, or any other form of processed data or combination of data.

An accurate 3D model can be helpful for visualization purposes. In some instances, it possible to extract usable and relevant information from the 3D scan without generating a full 3D model.

The processed data in the form of a digital 3D model, can be used to get the information for drydocking. This data—and the methods for which it can be obtained—can include, but is not limited to vessel hydrostatics information and vessel scan information:
  Vessel scan information or features:
    Below and above water scans and ultra-sounding hull with divers, ROVs, underwater mounts, shipside services for the purposes of drydocking. Such scans can identify one or more protrusions, indentations, ports, damage, growth, and abnormalities of the hull of the vessel that may impact drydocking of the vessel.
  Vessel hydrostatics information or features:
  Vessel Condition:
    Drafts (depth of the vessel in the water measured in a vertical direction relative to a waterline at specific points)—obtained by dimensioning Trim (difference between forward and aft drafts)—obtained by dimensioning List (difference between port and starboard drafts)—obtained by dimensioning Hog/Sag or Higher orders of vessel bending—obtained by careful observation of the vessel's deflections, dimensioning, and knowledge of previous vessel's loading and deflection Hydrostatics:
- Displacement (weight/mass of a vessel)—obtained by way of ordinary naval architecture analysis—calculating the underwater volume, and utilizing the density of water
- MT1 (moment to trim 1 in/cm)—obtained by way of ordinary naval architecture analysis
- MH1 (ML1—moment to heel/list 1 in/cm)—obtained by way of ordinary naval architecture analysis
- TPI (LT/t to change draft 1 in/cm)—obtained by way of ordinary naval architecture analysis
- LCF (Longitudinal)—obtained by means of ordinary naval architecture analysis
- TCF (Transverse Center of Floatation)—obtained by way of ordinary naval architecture analysis
- KMt (Keel to Metacenter; transverse stability)—obtained by way of ordinary naval architecture analysis
- KMl (Keel to Metacenter; longitudinal stability)—obtained by way of ordinary naval architecture analysis
- KB (Keel to center of Buoyancy)—obtained by way of ordinary naval architecture analysis
- LCB (Longitudinal Center of Buoyancy)—obtained by way of ordinary naval architecture analysis
- TCB (Transverse Center of Buoyancy)—obtained by way of ordinary naval architecture analysis.
- BMt (center of Buoyancy to Metacenter; transverse stability)—obtained by way of ordinary naval architecture analysis
- BMl (center of Buoyancy to Metacenter; longitudinal stability)—obtained by way of ordinary naval architecture analysis
- Cb (Block Coefficient)—obtained by means of ordinary naval architecture analysis
- Cp (Prismatic Coefficient)—obtained by means of ordinary naval architecture analysis
- Cm (Maximum sect area Coeff)—obtained by means of ordinary naval architecture analysis
- Cwp (Waterplane area Coeff)—obtained by means of ordinary naval architecture analysis Drag parameters—obtained by way of ordinary naval architecture analysis Stability
- GMt (center of Gravity to Metacenter; transverse stability)—obtained by means of ordinary naval architecture analysis
- GMl (center of Gravity to Metacenter; longitudinal stability)—obtained by means of ordinary naval architecture analysis Loading
- KG (Keel to center of Gravity)—obtained by way of ordinary naval architecture analysis (observing ship roll over time)
- LCG (Longitudinal Center of Gravity)—obtained by way of ordinary naval architecture analysis
- Transverse Center of Gravity—obtained by way of ordinary naval architecture analysis Cross curves of stability
- GZ (Gravity to righting force)—obtained by means of ordinary naval architecture analysis Hull form
- Hull Shape—obtained by way of ordinary naval architecture analysis
- Length—obtained by dimensioning
- Beam—obtained by dimensioning
- Hull irregularities—obtained by dimensioning
- Projections/Appendages locations and dimensions—obtained by dimensioning and careful observation of data/anomalies
- Hull openings—obtained by dimensioning careful observation of data/anomalies
- Beam at draft—obtained by dimensioning
- Navigational draft—obtained by dimensioning
- Abnormalities—obtained by dimensioning and careful observation of data/anomalies: Damage, Unknown Changes, Sea growth, Ice Structural Understanding—obtained by dimensioning
- Integrity
- Degradation
- Strength member locations
- LBP (Length Between Perpendiculars), AP (Aft Perpendicular), FP (Forward Perpendicular), and MP (Mid Perpendicular)
- LOA (Length Overall)
- Weak points
- Tank locations Above water scan items:
- Fit—obtained by dimensioning
- Beam
- Length
- Overhead projections
- Freeboard—obtained by dimensioning
- Supplementary data to any other listed/unlisted underwater scan items In some embodiments, various processes may be used to extract usable and relevant information used for drydocking (for example, any of the information identified above). For example, some of the information may be obtained using dimensioning. Dimensioning may comprise taking digital measurements of the 3D models, such as a distance measurement. For example, by determining an overall length of the 3D model and vessel, a longitudinal length of the 3D model can be measured as well. In some embodiments, the dimensioning and/or other distance finding may be performed using naval architecture analysis.

The above vessel scan information can be usefully applied to create or generate docking information, which may be relevant to docking of the vessel. In some embodiments, the docking information can include one or more of, or one or more of the following can be generated based on the docking information, or the docking information may comprise:
- Docking Feasibility or feasibility study
- Hydrostatic curves or tables (like "draft and other properties curves" or "Curves of form")
- Cross curves of stability
- Docking Plan
- Blocking Plan
- Pumping Plan
- Other vessel drawings With relevant and useful data extracted for drydocking, preparations for a safe drydocking can take place. A safe drydocking is one that all significant aspects of a drydocking are known, there is no significant uncertainty of loading, fit, interference, navigation, stability, or any other concerns of drydocking. A safe drydocking is one that is analyzed at every phase of an operation for navigational interference, stresses, time constraints, dock operational considerations. A safe drydocking should have in depth analysis that, at a minimum, meets the standards set up by MIL-STD 1625 and NSTM 997. Further details are provided below with respect to FIGS. 1-12.

FIG. 1 is a block diagram of a process for 3D scanning and drydocking a water vessel 100. The vessel 100 is not flat-bottomed and has some shape to its hull. The process includes scanning the water vessel 100 with a sensor 102 while the water vessel 100 is floating in water 101 (for example, before the water vessel is moved into the dry dock). In some embodiments, the sensor 102 generates one or more two-dimensional (2D) and three-dimensional (3D) digital scans of the water vessel 100 while moving around the vessel 100. In some embodiments, the sensor 102 only scans a portion of a hull of the water vessel 100 that is below a waterline of the water 101. As shown, a remote operating vehicle (ROV) 103 operates and/or moves the sensor 102. In some additional and/or alternative embodiments, a diver operates the sensor 102.

The sensor 102 conveys the digital scans and/or other information generated by the sensor 102 to a computing system 104. In some embodiments, the computing system 104 includes software and/or employs artificial intelligence or similar models or similar functionality to generate a 3D model of the water vessel 100 based on the scans and other information provided by the sensor 102. The scans by the sensor 102 may be in any direction and/or any perspective (for example, of a keel profile of the vessel 100, and so forth). The generated 3D model of the water vessel 100 may show any protrusions, abnormalities, indentations, ports, damage, growth, and so forth that exist on the hull of the water vessel. The computing system 104 may use the generated 3D model of the water vessel 100 to generate a docking plan 106 for the water vessel 100. The docking plan 106 may be a plan for docking the water vessel 100 in a dry dock such that the vessel is supported outside of the water and may comprise a blocking plan used in drydocking, where the blocking plan identifies how/where to place blocks that support the water vessel) In some embodiments, the docking plan 106 is only generated after the computing system 104 determines that docking of the vessel 100 is feasible. The computing system 104 may generate the docking plan 106 based on the information captured by the sensor 102, previously known information, and analysis of the captured information. For example, the computing system 104 may use the 3D model of the vessel 100 to extract one or more parameters regarding the vessel 100 for generating the docking plan 106. In some embodiments, the docking plan 106 comprises a document that contains information to dry dock the vessel 100, which may include, but is not limited to, vessel dimensions, block locations for different docking positions and spacing, hull openings/appendages, protrusions, equipment, among other considerations of the hull form of the vessel, the structure of the vessel and so forth. In some embodiments, the docking plan 106 comprises or is used by the computing system 104 to generate a blocking plan. The blocking plan may be a specific plan to support a particular vessel and may include the docking position, block spacing, and modifications due to interferences, among other information.

The docking plan 106, generated based on the 3D model and corresponding parameters, may comprise a docking plan that reflects the shape of the vessel 100 hull so that the vessel 100 is accurately and safely supported when dry docked.

The docking plan 106 may include details regarding how the water vessel 100 should be supported while dry docked. For example, such details include the shape of the hull, where/how the water vessel 100 can be supported by one or more blocks and/or similar structures in view of locations and sizes of protrusions, abnormalities, indentations, ports, damage, growth, and so forth on the hull of the water vessel 100. In some embodiments, the computing system 104 uses a custom algorithm to generate the docking plan 106 based on the scan data and other information received from the sensor 102. For example, the custom algorithm may involve:

Eliminating outlier data (completed manually, could be automated to some extent). By graphing the 3D scan data and visually inspecting the data, these outliers can be easily found and removed.

Reducing the data by averaging local data and surface fitting, creating a smooth useable hull shape. From this information the docking plan can be created.

After the computing system 104 prepares the docking plan 106, the water vessel 100 is safely dry docked as shown in 108, where blocks and other supports are located relative to the locations and sizes of protrusions, abnormalities, indentations, ports, damage, growth, and so forth on the hull of the water vessel 100. Without the docking plan 106 generated based on the 3D model of the vessel 100, the vessel 100 may be supported improperly, resulting in a point load on the vessel 100 and/or inadequate support of the vessel, which can damage the vessel 100, the dry dock, and/or vessel supports, and even result in human injury or death.

Figure 2:
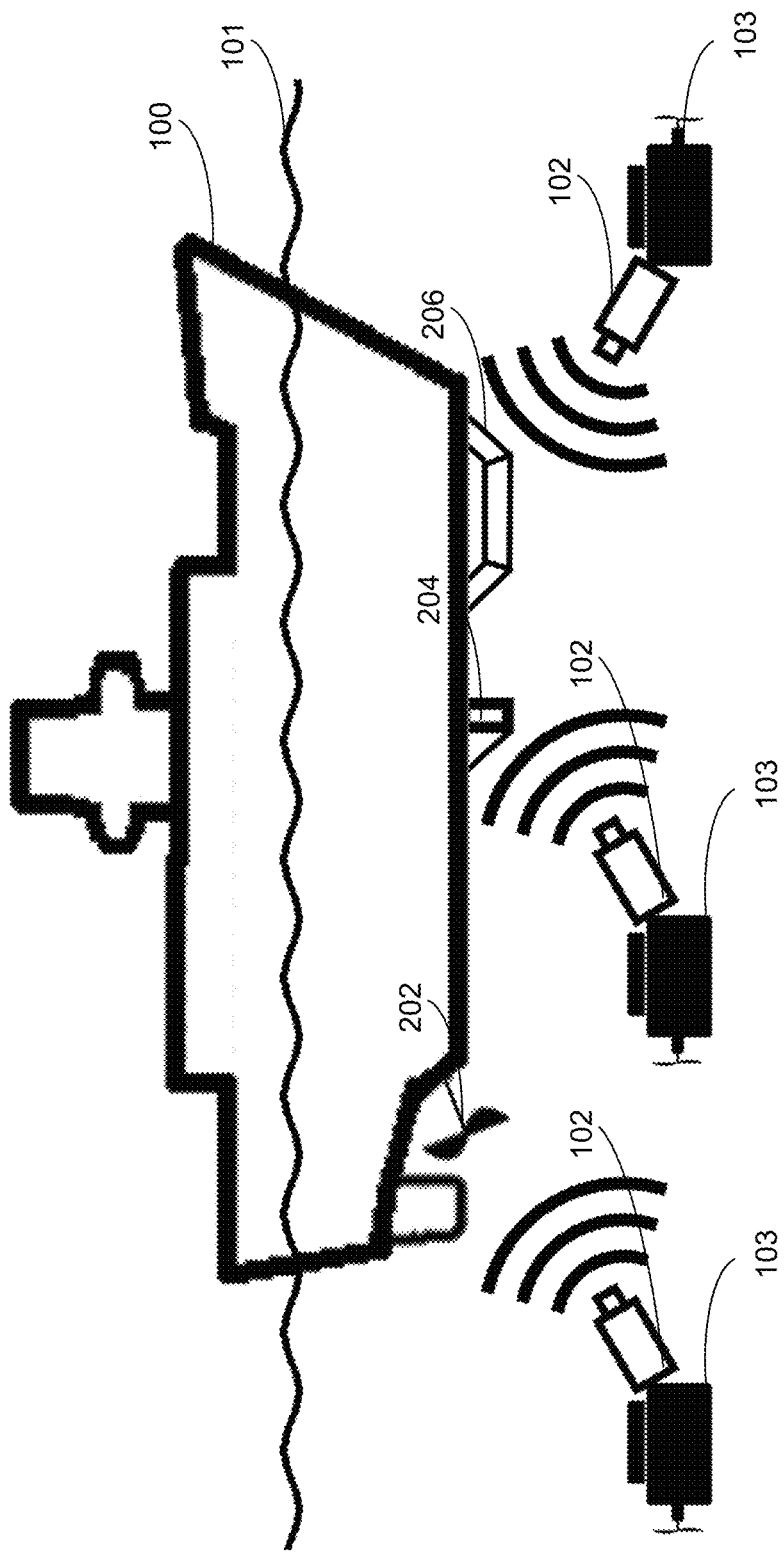
FIG. 2 is a diagram of a process for 3D scanning the water vessel of FIG. 1.

FIG. 2 is a diagram of a process for 3D scanning the water vessel of FIG. 1. The water vessel 100 is shown in the water 101 with various protrusions from the hull of the vessel 100, including a propeller 202, a speed log 204, and a sonar dome 206. The ROV 103 is shown using the sensor 102 to generate scans of the vessel 100 including each of the propeller 202, the speed log 204, and the sonar dome 206. Each of the propeller 202, the speed log 204, and the sonar dome 206 are protrusions from the hull of the vessel 100. In some embodiments, a single ROV 103 may perform all scans of the hull of the vessel 100, including all protrusions from the hull of the vessel 100. In some embodiments, multiple ROVs 103 are used with multiple sensors 102 to generate all scans of the hull of the vessel 100 more quickly. The sensor(s) 102 then transmit or convey the scans generated by the sensor(s) 102 to the computing system 104.

In some embodiments, the computing system 104 generates the 3D model of the water vessel 100 based on the scans and other information provided by the sensor 102. The generated 3D model of the water vessel 100 may show the scanned protrusions, abnormalities, indentations, ports, damage, growth, and so forth that exist on the hull of the water vessel. The computing system 104 may generate the docking plan 106 for the water vessel 100, extracting the appropriate parameters regarding the vessel 100 and/or protrusions to generate the docking plan 106 that reflects the protrusions on the vessel 100 hull so that the vessel 100 is accurately and safely supported when dry docked. The docking plan 106 may include details regarding how the water vessel 100 will be supported while dry docked, accounting for the known protrusions identified in the scans by the sensor(s) 102. Without the docking plan 106 generated based on the 3D model of the vessel 100, the vessel 100 may be supported improperly, resulting in, for example, damage to the protrusions or unbalanced support of the vessel 100.

Figure 3:
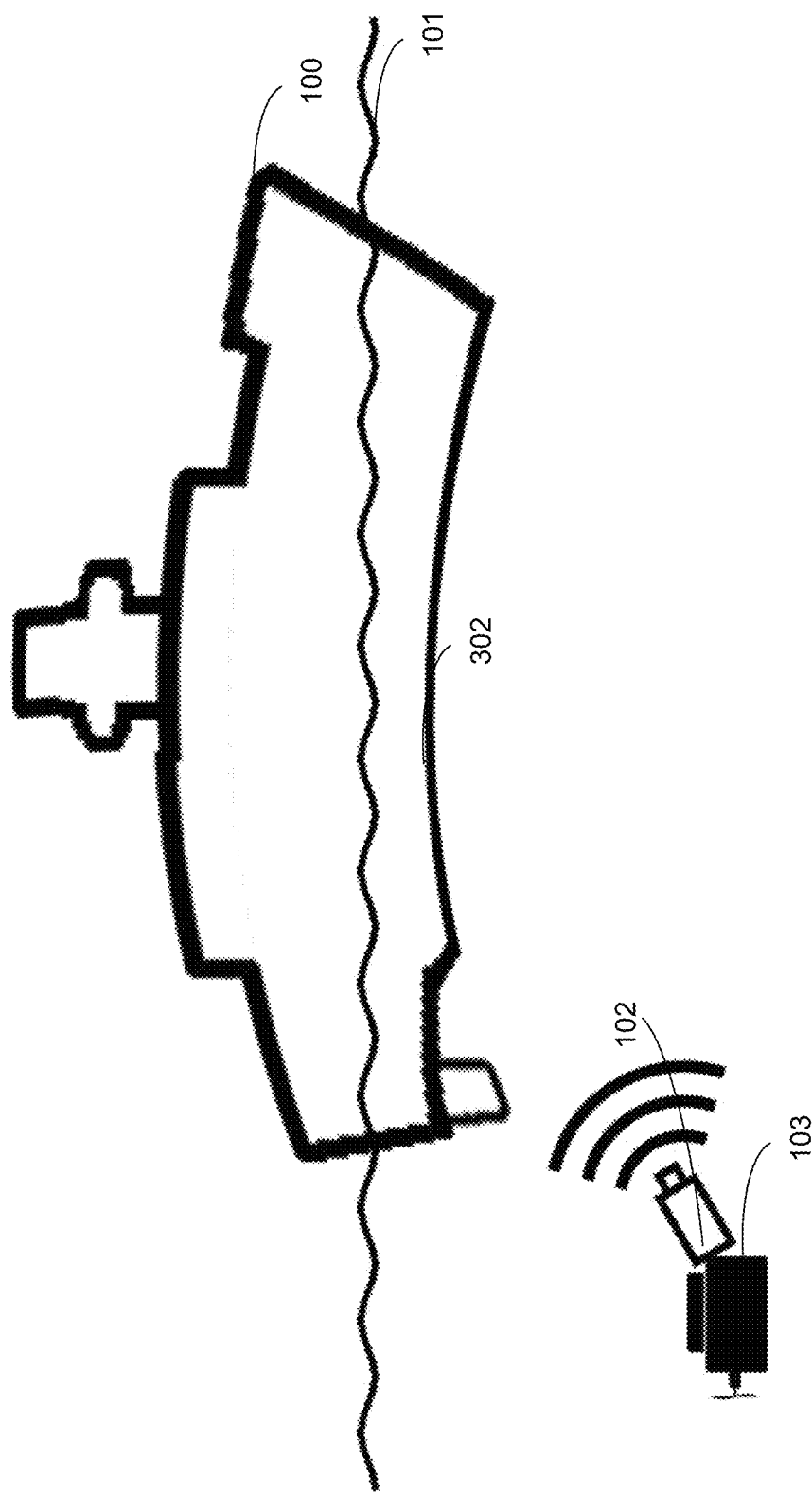
FIG. 3 is a diagram of a process for 3D scanning a water vessel having a hogged hull.

FIG. 3 is a diagram of a process for 3D scanning a water vessel having a hogged hull. The water vessel 100 is shown in the water 101, where the vessel 100 has a hogged hull (for example, a hull that is concave relative to the water 101). The ROV 103 is shown using the sensor 102 to generate scans of the vessel 100 including scans of the hogged (or bowed) portion 302 of the hull of the vessel 100. The hogged portion 302 of the hull of the vessel 100 may be an abnormality of the hull of the vessel 100. In some embodiments, a single ROV 103 may perform all scans of the hull of the vessel 100, including the hogged portion 302 of the hull of the vessel 100. In some embodiments, multiple ROVs 103 are used with multiple sensors 102 to generate all scans of the hogged portion 302 of the hull of the vessel 100 more quickly. The sensor(s) 102 then transmit or convey the scans generated by the sensor(s) 102 to the computing system 104.

In some embodiments, the computing system 104 generates the 3D model of the water vessel 100 based on the scans and other information provided by the sensor 102. The generated 3D model of the water vessel 100 may show the hogged portion 302 of the vessel 100 hull. The computing system 104 may generate the docking plan 106 for the water vessel 100, extracting the appropriate parameters regarding the hogged portion 302 of the vessel 100 hull so that the vessel 100 is accurately and safely supported when dry docked. The docking plan 106 can show how to support the vessel 100 to reduce stress/strain as it sits on the blocks while accounting for the hogged portion 302 of the vessel 100 hull.

Figure 4:
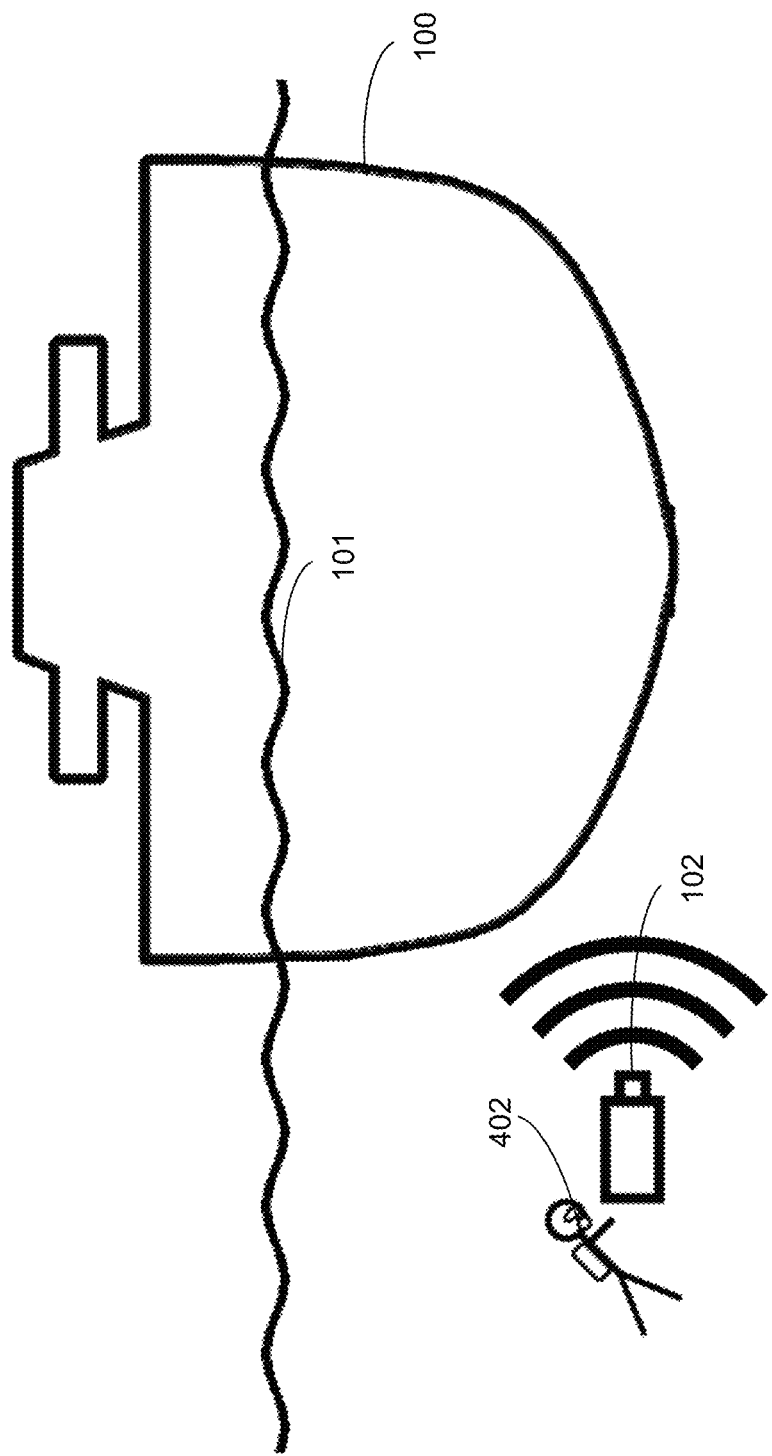
FIG. 4 is a diagram of a diver 3D scanning the hull of the water vessel of FIG. 1.

FIG. 4 is a diagram of a diver 3D scanning the hull of the water vessel of FIG. 1. In FIG. 4, the diver 402 is shown operating the scanner 102 to scan the hull of the vessel 100.

Figure 5:
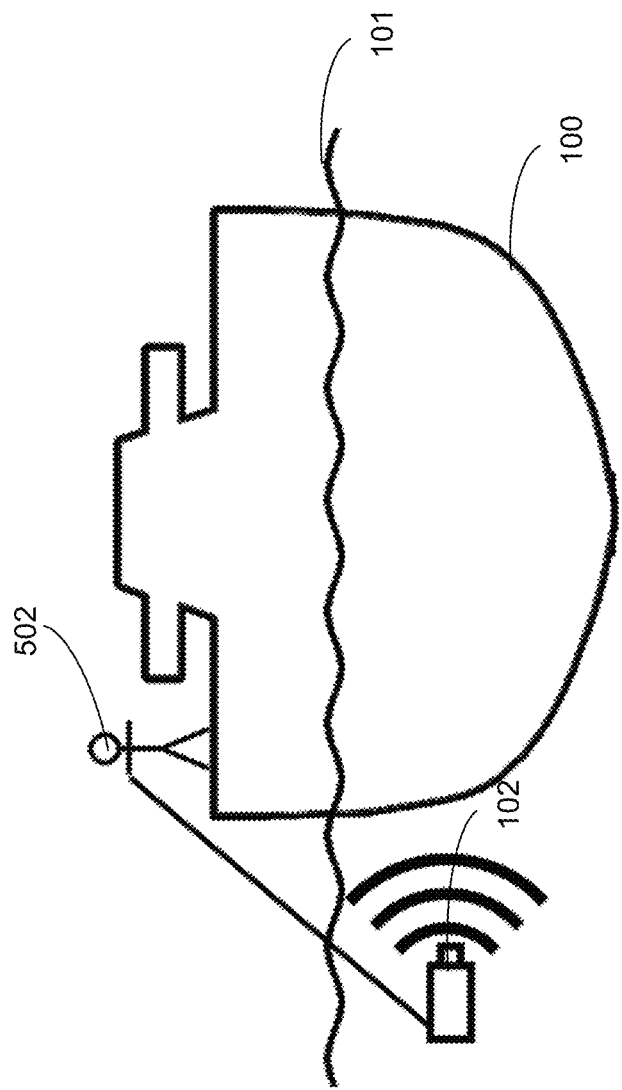
FIG. 5 is a diagram of a worker using a pole to 3D scan the hull of the water vessel of FIG. 1.

FIG. 5 is a diagram of a worker using a pole to 3D scan the hull of the water vessel of FIG. 1. In FIG. 5, an operator 502 for the sensor 102 is shown standing on a deck (or elsewhere on the vessel 100) and controlling the sensor 102 (for example, via a pole) to scan the hull of the vessel 100.

Figure 6:
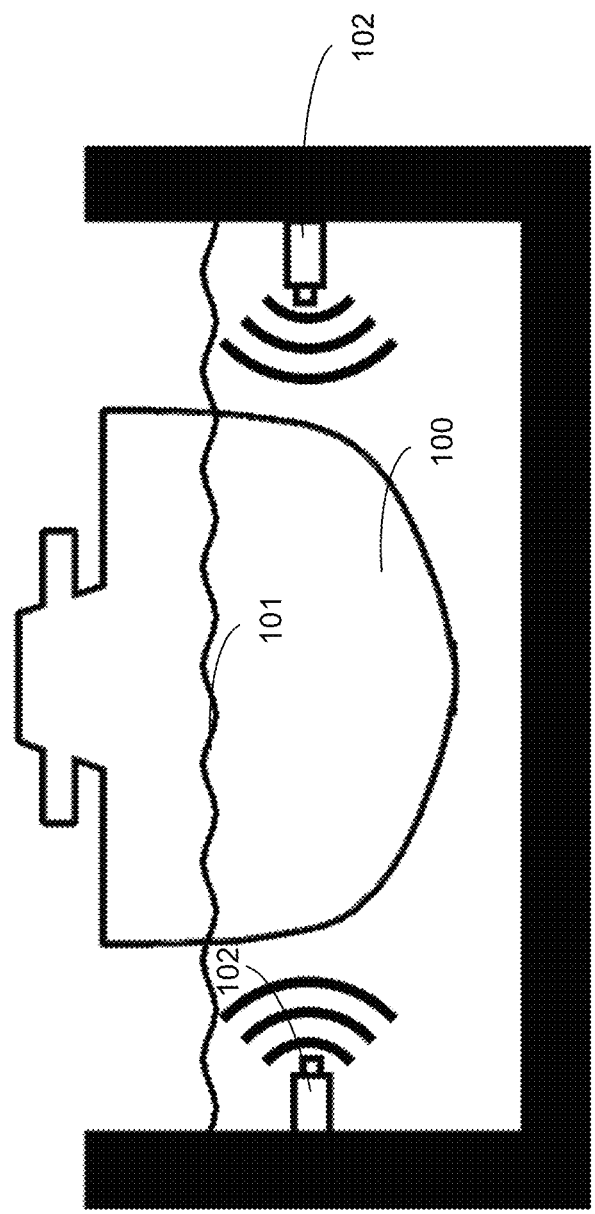
FIG. 6 is a diagram of a flooded dry dock having sensors mounted therein to 3D scan the hull of the water vessel of FIG. 1.

FIG. 6 is a diagram of a flooded dry dock having sensors mounted therein to 3D scan the hull of the water vessel of FIG. 1. In FIG. 6, the dry dock includes one or more sensors 102 used to scan the hull of the vessel 100 before the dry dock is drained.

Figure 7:
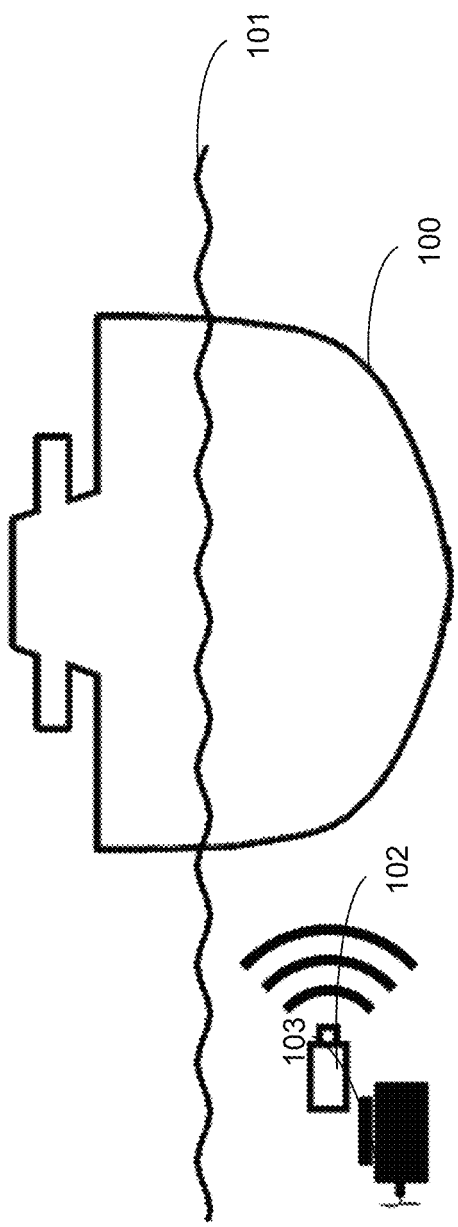
FIG. 7 is a diagram of remotely operated vehicle 3D scanning the hull of the water vessel of FIG. 1.

FIG. 7 is a diagram of remotely operated vehicle 103 3D scanning the hull of the water vessel of FIG. 1. In FIG. 7, the ROV 103 moves the sensor 102 to scan the hull of the vessel 100. In some embodiments, the ROV 103 is controlled by an operator on the vessel 100 or in the dry dock or elsewhere.

Figure 8:
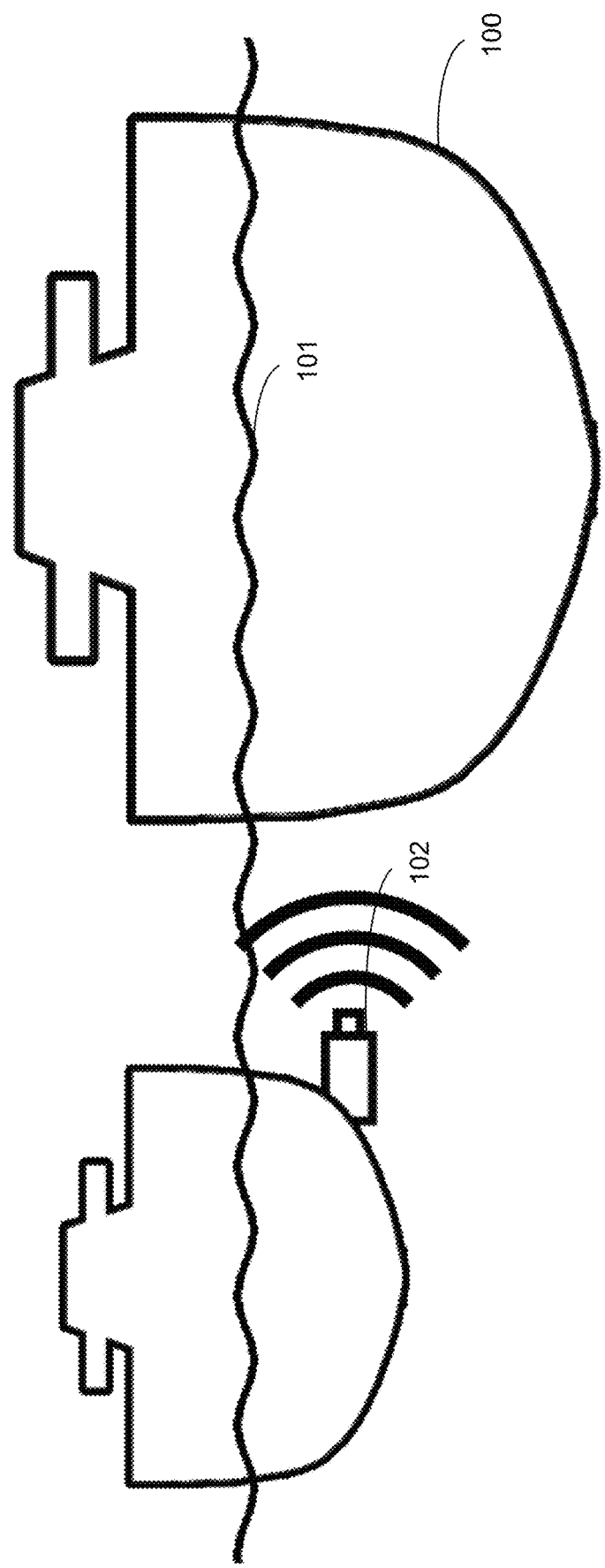
FIG. 8 is a diagram of a ship 3D scanning the hull of the water vessel of FIG. 1.

FIG. 8 is a diagram of a ship 3D scanning the hull of the water vessel of FIG. 1. In FIG. 8, a second ship or vessel can move the sensor 102 to scan the hull of the vessel 100. For example, the second ship may be a tug boat or similar other ship or boat or any other ship or boat.

Figure 9:
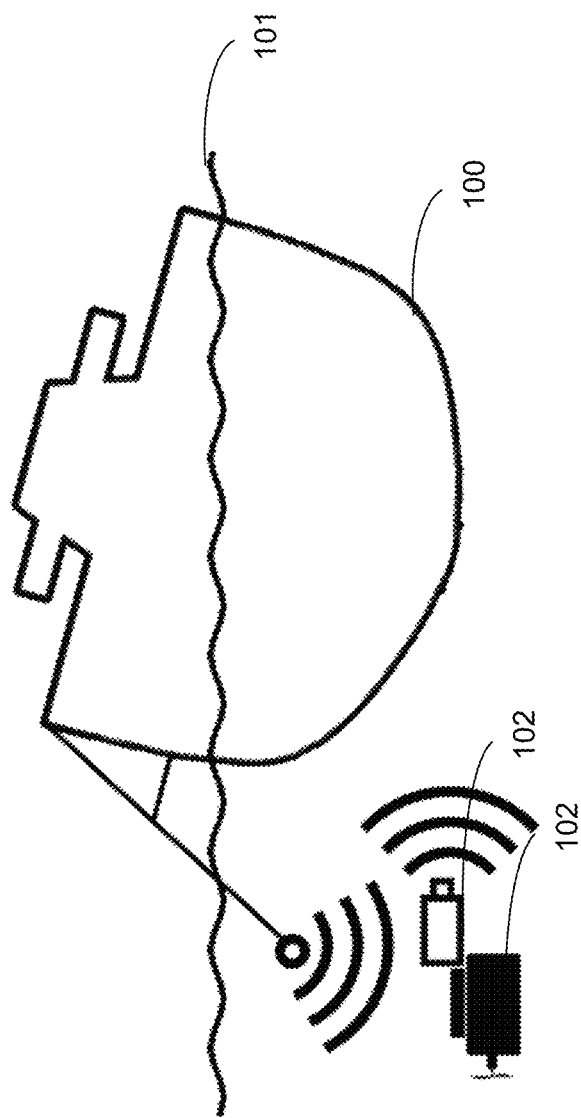
FIG. 9 is a diagram of the remotely operated vehicle of FIG. 1 3D scanning the hull of the water vessel utilizing a positioning system relative to the water vessel.

FIG. 9 is a diagram of the remotely operated vehicle of FIG. 9 3D scanning the hull of the water vessel 100 utilizing a positioning system relative to the water vessel 100. The ROV 103 scanning the vessel 100 using the sensor 102 may utilize a positioning system relative to the vessel 100 being scanned. For example, the positioning system may track movement and/or position of the sensor 102 relative to movement and/or position of the vessel 100, respectively. The positioning system can eliminate issues of scanning the vessel 100 while the vessel 100 is moving, as shown in FIG. 9. For example, as shown in FIG. 9, the ROV 103 and the sensor 102 may be positioned in the water 100 such that scans of the hull of the vessel 100 are taken and/or generated relative to the vessel 100. Accordingly, the scans and/or other information generated by the sensor 102 disregard any vessel 100 movements (for example, pitch, yaw, roll, sway, surge, heave, and so forth). For example, data of the vessel 100 movements can be obtained from the vessel 100 and used to modify the position/rotation data of the sensor 102 to be relative to the vessel 100 when generating the 3D models from the scans and data from the sensor 102.

In some embodiments, once the computing system 104 generates the 3D model of the vessel 100 from the scans and other information provided by the sensor 102, the computing system 104 may use the 3D model of the vessel 100 to perform docking feasibility. In some embodiments, the docking feasibility may comprise the computing system 104 determining whether or not docking of the vessel is even possible, given the information generated and/or obtained from the 3D model of the vessel 100.

In some embodiments, once the computing system 104 determines or generates the 3D model of the vessel 100 from the scans and other information provided by the sensor 102, the computing system 104 may process the generated 3D model to identify and extract useful and relevant information that is then used to create the docking plan 106. For example, the computing system 104 may use the generated 3D model to identify sizes, locations, quantities, and so forth of any protrusions, abnormalities, indentations, ports, damage, growth, and so forth that exist on the hull of the vessel 100. For example, the computing system 104 may perform dimensioning to identify sizes and locations of any protrusions, abnormalities, indentations, ports, damage, growth, and so forth that exist on the hull of the vessel 100. The computing system 104 may then use the sizes, locations, etc., to generate the docking plan to show where blocks 1002 to support the vessel 100 can and/or cannot be positioned relative to the vessel 100 hull. In some embodiments, the computing system 104 performs dimensioning by taking digital measurements of the 3D model of the vessel 100 (for example, by measuring a distance between items of interest). In some embodiments, the computing system 104 may determine an overall length of the vessel 100 and then dimension a longitudinal length of the 3D model of the vessel 100. In some embodiments, the dimensioning of the 3D model of the vessel 100 can be performed using naval architecture analysis. In some embodiments, the computing system 104 may perform the dimensioning with accuracies of +/−6 inches in all directions, +/−1 inch in all directions, +/−½ inch in all directions, or +/−¼ inch in all directions. In some embodiments, the computing system 104 may perform dimensioning with accuracies of +/−1 inch longitudinally, +/−½ inch transversely, and +/−¼ inch vertically. In some embodiments, these accuracies may range.

As described in brief above, the computing system 104 may generate the docking plan 106. In some embodiments, the docking plan 106 is only generated after the computing system 104 performs a docking feasibility for the vessel 100 and determines that docking is feasible. The computing system 104 may generate the docking plan 106, as described herein, based on the parameters obtained from the 3D model of the vessel, and also generate the blocking plan and/or a pumping plan, which controls how water is pumped from the vessel 100 and the dry dock. In some embodiments, generating the docking plan comprises the computing system 104 ensuring that all corresponding standards for drydocking are met. For example, the computing system 104 may ensure that MIL-STD 1625 and NSTM 997 standards are met with regard to, for example, loading analysis of the vessel 100, which may determine how much support is sufficient to safely and accurately support the vessel 100 when out of the water 101 in the dry dock.

In some embodiments, the computing system 104 uses the 3D model of the vessel 100 and knowledge of the dry dock and corresponding blocks 1002 and supports to ensure that the dry dock is capable of drydocking the vessel 100 before generating the docking plan. For example, the computing system 104 may use the 3D model of the vessel 100 and knowledge of the dry dock to determine that the vessel 100 will fit in the dry dock (navigationally and/or physically). In some embodiments, determining the docking feasibility includes the computing system 104 performing minimum calculations to show that the vessel 100 can be adequately supported in the dry dock. In some embodiments, the computing system 104 may determine that the vessel 100 has a specific shape or particular protrusions and ensures that the supports and/or blocks 1002 of the dry dock can support that shape and/or protrusion arrangement. When the computing system 104 determines that docking the vessel 100 in the dry dock is feasible, the computing system 104 may generate the docking plan 106 and/or the blocking plan to reflect shape and/or protrusions, etc., of the vessel 100 so that the vessel 100 can be safely and accurately supported without damage to the vessel 100 or the dry dock or injury to any people.

In some embodiments, the computing system 104 may generate one or more of the docking feasibility described herein, one or more hydrostatic curves, cross curves of stability, the docking plan 106 (for example comprising one or both of the docking plan and the blocking plan), and the pumping plan.

For example, the computing system 104 may analyze the steps to safely dry dock the vessel 100 and use the 3D model to verify that such steps can be performed to safely and accurately dry dock the vessel 100. When generating the docking plan 106 that reflects the shape and protrusions, etc., of the vessel 100, the computing system 104 may derive parameters for the blocking plan (for example, where to plan to place the blocks to support the vessel 100) by digitally dimensioning the 3D model of the vessel 100, as described above. The computing system 104 may determine whether damage, protrusions, openings, hull abnormalities, excessive ice, marine growth, or other work to be done, will or interfere with placement of the block 402, and the computing system 104 may adapt or modify the blocking plan so that interfering blocks are remove or moved to avoid issue.

In some embodiments, the computing system 104 may provide compensating measures for any issues regarding instability, etc., identified from the 3D model of the vessel 100 (for example, when doing pre-docking calculations outlined in MIL-STD 1625). For example, if the computing system 104 determines that an instability is found before adequate side support is in place, the computing system 104 may provide for improving stability of the vessel 100 by adding low weight or removing high weight on the vessel 100, reducing free surface, and/or the reduction of a knuckle reaction. Similarly, if the computing device determines that the vessel 100 loading is found to be too high for the number of blocks 1002 planned, the computing device 104 may add blocks at safe, strong location on the vessel 100 (for example, locations that can support the distributed weight of the vessel 100).

Figure 10:
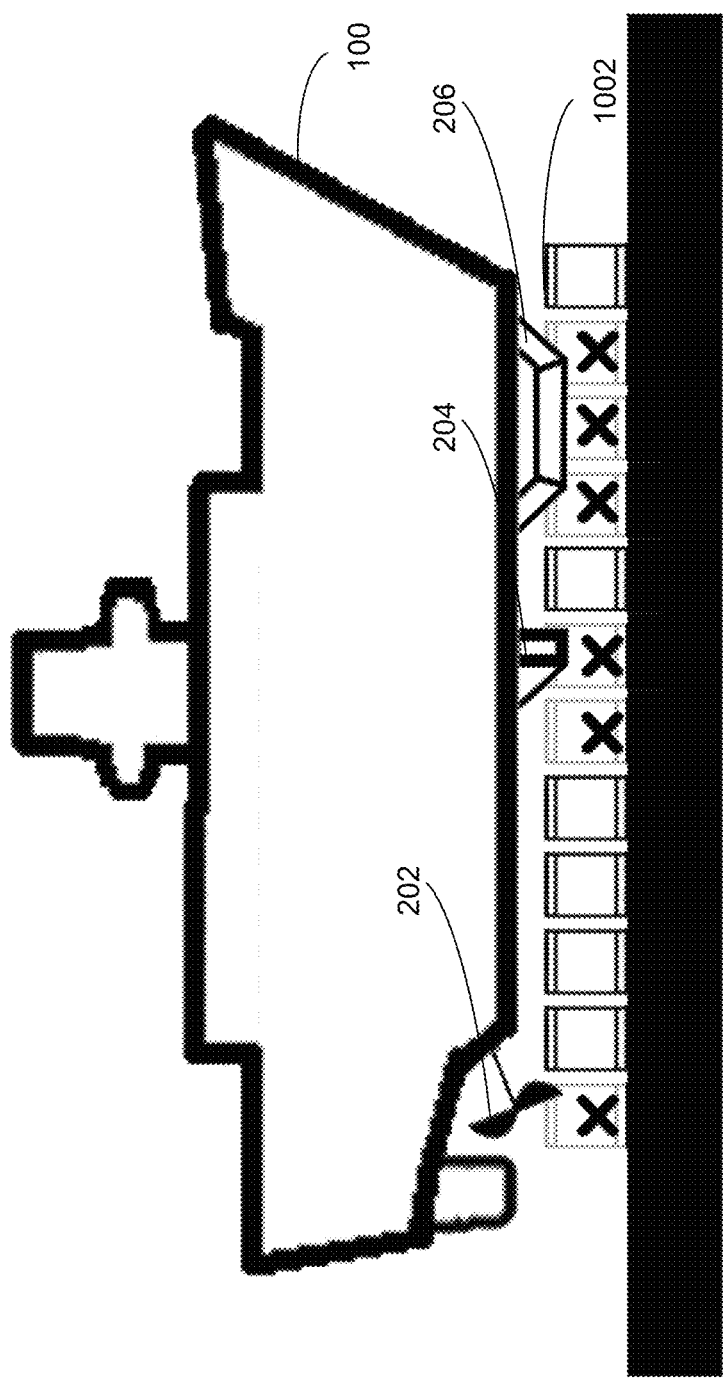
FIG. 10 is a diagram of a dry docked vessel where blocks would interfere with projections on a hull of the water vessel of FIG. 1.

FIG. 10 is a diagram of a dry docked vessel where blocks would interfere with projections on a hull of the water vessel of FIG. 1. As described herein, when the vessel 100 is dry docked, the vessel 100 may be supported by one or more blocks or similar structures such that all exterior portions of the vessel 100 are accessible for maintenance, repair, and so forth. As shown in FIG. 10, blocks 1002 may be placed supporting the hull of the vessel 100 such that a bottom portion of the hull is not in direct contact with the floor or any portion of the dry dock (or similar location or support). Thus, the blocks 1002 may be supporting a weight of the vessel 100.

Since the blocks 1002 are supporting the weight of the vessel 100, the blocks are placed along the hull of the vessel 100 such that they contact the hull of the vessel 100 at locations where the hull of the vessel 100 is strong enough and sufficiently shaped to provide such support to the blocks 1002. For example, areas of damage to the hull may not be strong enough to support the weight of the vessel 100 if the block is placed on or too close to the damaged area(s). Similarly, protrusions form the vessel 100 (such as the propeller 202, the speed log 204, and the sonar dome 206) may not be strong enough to support the weight of the vessel 100 if the blocks 1002 are placed on or in contact with the protrusions when drydocking the vessel 100. As shown in FIG. 4, the docking plan 106 for the vessel 100 may be modified to remove/modify location of one or more of the blocks 1002 (for example, crossed out blocks 1002 would be removed from the docking plan for the vessel 100) so that the protrusions are not in contact (avoiding interference) with the blocks 1002 supporting the vessel 100. Thus, FIG. 4 shows how the vessel 100 is aligned with the blocks 1002 to avoid protrusions and other parameters of the hull of the vessel 100.

Figure 11:
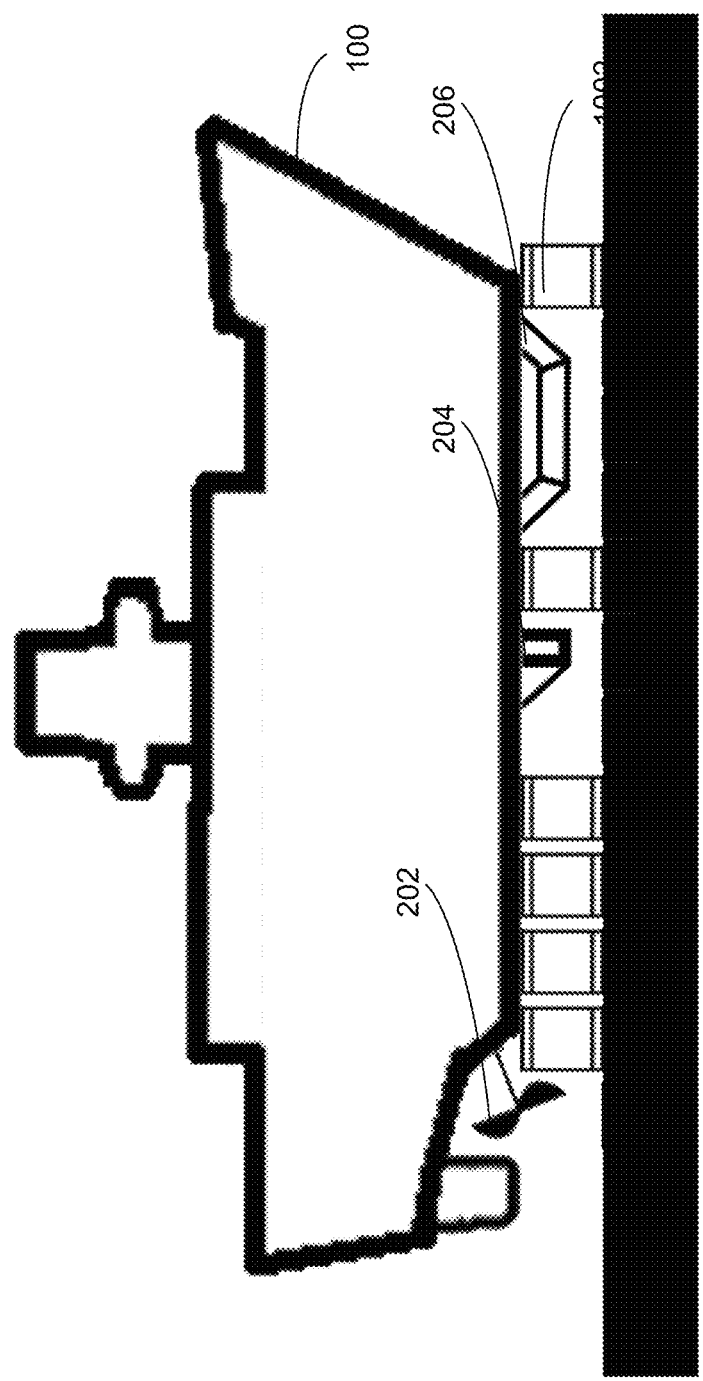
FIG. 11 is a diagram of the dry docked vessel of FIG. 10 where blocks are removed so as to not interfere with projections on the hull of the water vessel.

FIG. 11 is a diagram of the dry docked vessel of FIG. 11 where blocks are removed so as to not interfere with projections on the hull of the water vessel. As described herein, when the vessel 100 is dry docked, the vessel 100 may be supported by one or more blocks or similar structures such that all exterior portions of the vessel 100 are accessible for maintenance, repair, and so forth. As shown in FIG. 11, blocks 1002 may be placed supporting the hull of the vessel 100 such that a bottom portion of the hull is not in contact with the floor (for example, of the dry dock). Thus, the blocks 1002 may be supporting a weight of the vessel 100.

As shown in FIG. 11, the blocks 1002 that are canceled on the docking plan 106 for the vessel 100 are removed so that nothing interferes with the protrusions of the vessel 100. Thus, FIG. 11 shows how the vessel 100 is aligned with the blocks 1002 to avoid protrusions and other parameters of the hull of the vessel 100.

Figure 12:
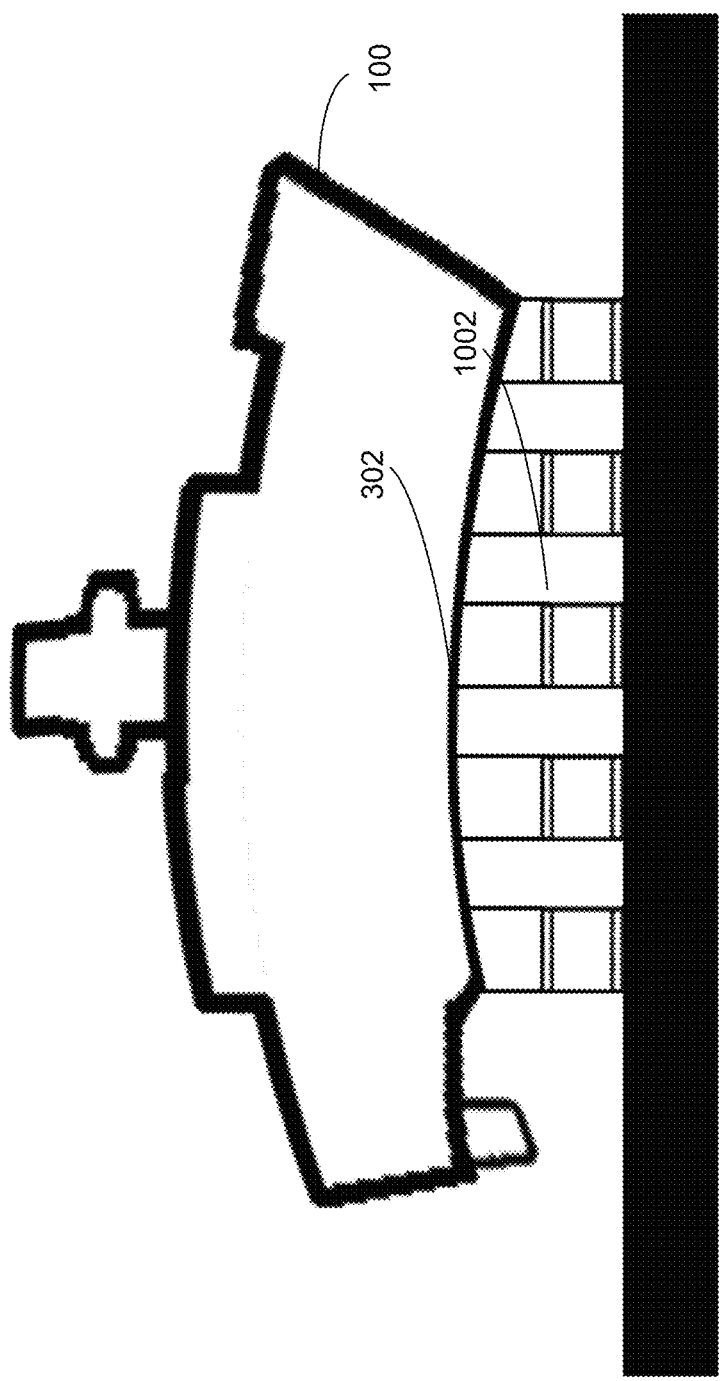
FIG. 12 is a diagram of the water vessel of FIG. 3 dry docked with blocks supporting the hogged hull of the water vessel.

FIG. 12 is a diagram of the water vessel of FIG. 3 dry docked with blocks supporting the hogged hull of the water vessel. As described herein, when the vessel 100 is dry docked, the vessel 100 may be supported by one or more blocks or similar structures such that all exterior portions of the vessel 100 are accessible for maintenance, repair, and so forth. As shown in FIG. 11, blocks 1002 may be placed supporting the hull of the vessel 100 such that a bottom portion of the hull is not in contact with the floor (for example, of the dry dock). Thus, the blocks 1002 may be supporting a weight of the vessel 100.

However, when the vessel 100 hull is hogged as shown in FIG. 12, some of the blocks 1002 of standard height (as shown in FIGS. 10 and 11) may be too short to support the hogged portion 302 of the hull of the vessel 100. As such, if the docking plan 106 is used with all the blocks 1002 having the same heights, then the weight of the vessel 100 may cause the vessel 100 to flex and experience stress and/or strain deviating from a resting position of the vessel 100 when in the water. Thus, the computing system 104 may generate the docking plan 106 such that blocks 1002 of different heights support the vessel 100 to compensate for the hogged portion 302 of the hull of the vessel 100. Thus, FIG. 12 shows how the vessel 100 is aligned with the blocks 1002 of varying heights to ensure that the hogged portion 302 the hull of the vessel 100 is properly supported (for example, that the blocks 1002 are positioned and/or built to match the shape of the hogged portion 302) such that the vessel 100 does not flex, pursuant to the docking plan 106 that includes parameters for the hogged portion 302.

Scanning Technologies

Various technologies may provide scans of 3D objects such that the scans can be aggregated and/or otherwise analyzed to generate a 3D model of the 3D object. As used herein, the sensor 102 may generate data and/or information that the computing system 104 uses to generate the 3D model of the vessel 100. In some embodiments, the sensor 102 comprises a passive or active non-contact sensor or a contact sensor. For example, the sensor 102 may be contact 3D scanner that physically touches the vessel 100 hull while the sensor 102 is scanning the vessel 100 hull and that uses a carriage system, an articulated arm, and/or a combination of both to move along the vessel 100. For example, the sensor 102 may be a coordinate measuring machine. In some embodiments, the sensor 102 is radiation or light emitting sensor that detects a reflection of emitted radiation or light to prove the object being scanned. Possible emissions include light, sound, and/or x-ray. As such, the sensor 102 may be a LIDAR scanner, a time-of-flight 3D laser scanner, or a time-of-flight camera, among other active, non-contact sensors. In some embodiments, the sensor 102 comprises a conoscopic system that provides for conoscopic holography. In some embodiments, the sensor 102 comprises a hand-held laser scanner, a structured light 3D scanner, or a modulated light 3D scanner. In some embodiments, the sensor 102 may comprise or be part of an industrial computed tomography system, a magnetic resonance imaging system, and a micro tomography system. When the sensor 102 is a non-contact passive sensor, the sensor 102 may comprise or be part of a stereoscopic system, a photometric system, a silhouette system, and a photogrammetry system.

3D Model Generation

The computing system 104 may generate one or more 3D models based on the 2D and/or 3D scans and other information/data provided by the sensor 102. In some embodiments, the computing system 104 may reconstruct the 3D models based on the received scans and data using one or more methods. For example, the computing system 104 may use point clouds when the sensor 102 generates point clouds from the 2D and 3D scans generated of the vessel 100 by the sensor 102. In some embodiments, the computing system 104 can use the point clouds to directly measure and/or visualize the vessel 102 imaged by the sensor 102. In some embodiments, the computing system 104 may use the 3D scans (for example, one or more of polygonal 3D models, surface models, CAD/Solid models, and so forth) from the sensor 102 to generate the 3D reconstruction (for example, the 3D model) of the vessel 100. In some embodiments, the polygonal models may be polygon mesh models and may represent surfaces as small faceted flat surfaces. In some embodiments, the surface models may use curved surface representation to model a shape of the surface using NURBS, TSplines, or other similar curved representations of a curved topology. The CAD/Solid models may maintain critical features and their relationship(s) to other features.

Alternatively, or additionally, the computing system 104 may generate the 3D model of the vessel 100 using 2D scans or "slices" of the vessel 100 as generated and provided by the sensor 102. As such, the 3D model of the vessel may be made by aggregating or stacking the 2D slices together. This may be done using volume rendering, where different parts of the scanned object are shown with different color densities, image segmentation, where unwanted structures are removed from the 3D model, and image-based meshing, where an accurate and realistic geometrical description of the scan data is generated automatically. Alternatively, or additionally, the computing system 104 may generate the 3D model of the vessel 100 using laser scans of the vessel 100 as generated and provided by the sensor 102.

Alternatively, or additionally Artificial Intelligence (AI) or machine learning (ML) models can be on the computing system 104. This AI used as method of processing data (such as masking photogrammetry, etc.). This can make processing of large amounts of data more feasible.

Figure 13:
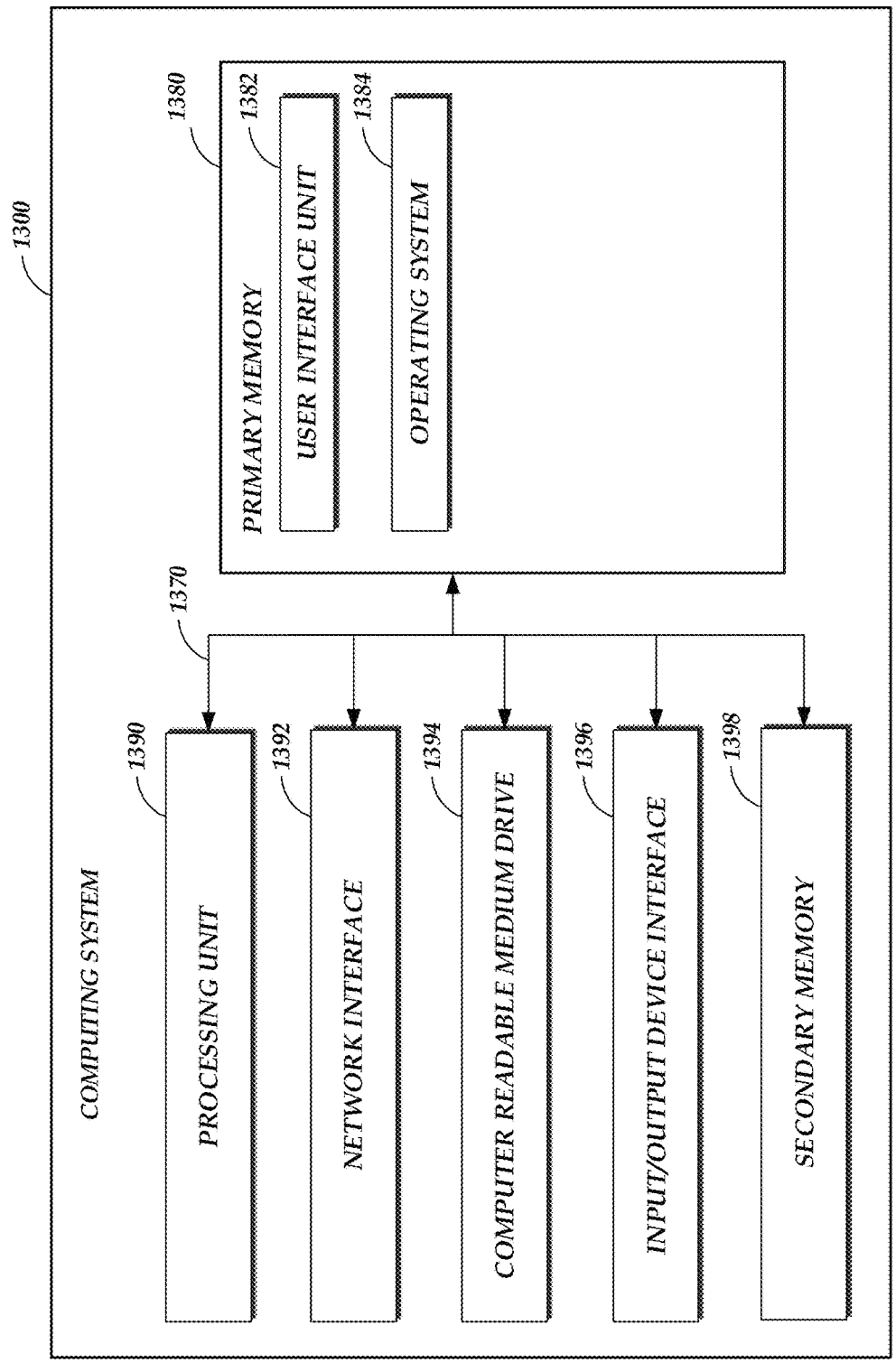
FIG. 13 depicts a general architecture of a computing device implementing one or more of the components of the system described herein.

FIG. 13 depicts a general architecture of a computing device implementing one or more of the components of the system described herein. The general architecture of the computing system 1300 depicted in FIG. 13 includes an arrangement of computer hardware and software that may be used to implement aspects of the present disclosure. The hardware may be implemented on physical electronic devices, as discussed in greater detail below. The software may be implemented by the hardware described herein. The computing system 1300 may include many more (or fewer) elements than those shown in FIG. 13. It is not necessary, however, that all of these generally conventional elements be shown in order to provide an enabling disclosure. Additionally, the general architecture illustrated in FIG. 13 may be used to implement one or more of the other components illustrated in FIG. 13.

As illustrated, the computing system 1300 includes a processing unit 1390, a network interface 1392, a computer readable medium drive 1394, and an input/output device interface 1396, all of which may communicate with one another by way of a communication bus 1370. The network interface 1392 may provide connectivity to one or more networks or computing systems. The processing unit 1390 may thus receive information and instructions from other computing systems or services via the network. The processing unit 1390 may also communicate to and from primary memory 1380 and/or secondary memory 1398 and further provide output information for an optional display (not shown) via the input/output device interface 1396. The input/output device interface 1396 may also accept input from an optional input device (not shown).

The primary memory 1380 and/or secondary memory 1398 may contain computer program instructions (grouped as units in some embodiments) that the processing unit 1390 executes in order to implement one or more aspects of the present disclosure. These program instructions are shown in FIG. 13 as included within the primary memory 1380 but may additionally or alternatively be stored within secondary memory 1398. The primary memory 1380 and secondary memory 1398 correspond to one or more tiers of memory devices, including (but not limited to) RAM, 3D XPOINT memory, flash memory, magnetic storage, cloud storage objects or services, block and file services, and the like. In some embodiments, all of the primary memory 1380 or the secondary memory 1398 may utilize one of the tiers of memory devices identified above. The primary memory 1380 is assumed for the purposes of description to represent a main working memory of the computing system 1300, with a higher speed but lower total capacity than secondary memory 1398.

The primary memory 1380 may store an operating system 1384 that provides computer program instructions for use by the processing unit 1390 in the general administration and operation of the computing system 1300. The memory 1380 may further include computer program instructions and other information for implementing aspects of the present disclosure. For example, in one embodiment, the memory 1380 includes a user interface unit 1382 that generates user interfaces (and/or instructions therefor) for display upon a computing device, e.g., via a navigation and/or browsing interface such as a web browser or software application installed on the computing device.

The computing system 1300 of FIG. 13 is one illustrative configuration of such a device, of which others are possible. For example, while shown as a single device, the computing system 1300 may, in some embodiments, be implemented as multiple physical host devices. In other embodiments, the computing system 1300 may be implemented as one or more virtual devices executing on a physical computing device. While described in FIG. 13 as a computing system 1300, similar components may be utilized in some embodiments to implement other devices shown in the system and methods described herein.

Additional Embodiments

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 1200, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage.

A model may generally refer to a machine learning construct which may be used to automatically generate a result or outcome. A model may be trained. Training a model generally refers to an automated machine learning process to generate the model that accepts an input and provides a result or outcome as an output. A model may be represented as a data structure that identifies, for a given value, one or more correlated values. For example, a data structure may include data indicating one or more categories. In such implementations, the model may be indexed to provide efficient look up and retrieval of category values. In other embodiments, a model may be developed based on statistical or mathematical properties and/or definitions implemented in executable code without necessarily employing machine learning.

Machine learning generally refers to automated processes by which received data is analyzed to generate and/or update one or more models. Machine learning may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between scan data and 3D models or parameters of 3D models and corresponding docking plans.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain methods or processes blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more specially configured general purpose computers. For example, the methods described herein may be performed by a processing system, card reader, point of sale device, acquisition server, card issuer server, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, compact disk read-only memories (CD-ROMs), magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "comprising" as used herein is synonymous with "including," and is inclusive or open-ended and does not exclude additional, unrecited elements or method steps. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The articles "a" and "an" are used herein to refer to one or to more than one (for example, at least one) of the grammatical object of the article. By way of example, "an element" means one element or more than one element.

The terms "about" or "around" as used herein refer to a quantity, level, value, number, frequency, percentage, dimension, size, amount, weight or length that is within error of available measurement techniques.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed is:

1. A method comprising:
using a scanning sensor, scanning at least one portion a hull of a vessel positioned below a waterline while the vessel is floating in water; and
via one or more hardware computer processors programmed based on instructions stored in a memory:
generating multi-dimensional scans of the at least one portion of the hull of the vessel that exists below the waterline based on data acquired by the scanning sensor during the scanning;
generating a 3-dimensional (3D) model of the at least one portion of the hull of the vessel that exists below the waterline based on combining two or more of the multi-dimensional scans;
analyzing the 3D model to identify one or more features of the hull of the vessel below the waterline, the one or more features of the hull including vessel hydrostatics information and/or vessel scan information;
generating docking information for drydocking the vessel based on the one or more features of the hull, wherein the docking information includes information for the one or more identified features and a shape of the at least one portion of the hull of the vessel that exists below the waterline;
identifying, based on the generated docking information, a docking plan for supporting the vessel when the vessel is supported out of the water, wherein the docking plan indicates where individual supports for the vessel can be located relative to the at least one portion of the hull of the vessel that exists below the waterline in consideration of the identified one or more features and the shape; and outputting instructions to dry dock the vessel based on the generated docking information and the docking plan based on locating the individual supports at locations identified by the docking plan, wherein the drydocking of the vessel resulting from the generated docking information and the docking plan results in the hull of the vessel not being in direct contact with any portion of a dry dock.

2. The method of claim 1, wherein the docking information and/or the docking plan comprises one or more of a docking feasibility, one or more hydrostatic curves, one or more cross curves of stability, a blocking plan, a pumping plan, or one or more vessel drawings that aid in the drydocking of the vessel.

3. The method of claim 2, wherein the docking plan includes the blocking plan, and the blocking plan provides details of one or more of blocks, cradles, shores, or other vessel support systems used to support the vessel when drydocked and a pumping plan that provides details of how to pump water from the vessel.

4. The method of claim 3, wherein the generating the docking information for drydocking and the generating the blocking plan comprise identifying locations, quantities, and dimensions of the one or more hull openings and hull appendages on the hull portion and accounting for the locations, quantities, and dimensions of the one or more hull openings in generating the docking plan and the blocking plan for the vessel such that the one or more of the blocks, cradles, shores, or other vessel support systems are located to avoid the protrusions, indentations, ports, damage, growth, and abnormalities of the hull of the vessel below the waterline.

5. The method of claim 1, wherein the scanning sensor is submerged below the waterline and comprises one of a contact sensor or a non-contact sensor.

6. The method of claim 1, wherein the one or more features of the hull further comprise a hull opening or a hull appendage.

7. The method of claim 1, further comprising implementing a positioning system to track movement and position of the scanning sensor relative to movement and position of the vessel, respectively.

8. The method of claim 1, wherein the information regarding any protrusions, indentations, ports, damage, growth, and abnormalities of the hull of the vessel below the waterline comprises size, location, and quantity information for the protrusions, indentations, ports, damage, growth, and abnormalities of the hull of the vessel below the waterline.

9. The method of claim 1, wherein the drydocking of the vessel resulting from the generated docking information and the support plan meets standards set by MIL-STD 1625 and NSTM 997.

10. The method of claim 1, further comprising drydocking the vessel based on the output instructions and/or the generated docking information and the support plan based on locating the individual supports at locations identified by the support plan.

11. A system for drydocking a vessel, the system comprising:

a scanning sensor configured to scan at least one portion of a hull of the vessel positioned below a waterline while the vessel is floating in water; and one or more hardware processors programmed by instructions to:
identify features of the hull of the vessel below the waterline based on data acquired by the scanning sensor of the at least one portion of the hull, the features including vessel hydrostatics information and/or vessel scan information;
generate docking information for drydocking the vessel based on the one or more features of the hull, wherein the docking information includes information for the one or more identified features and a shape of the at least one portion of the hull of the vessel that exists; and
generate instructions for drydocking the vessel based on the generated docking information, wherein the drydocking of the vessel results in the hull of the vessel not being in direct contact with any portion of a dry dock.

12. The system of claim 11, wherein the one or more hardware processors are further programmed to:
generate multi-dimensional scans of the hull of the vessel that exists below the waterline based on data acquired by the scanning sensor when scanning the plurality of portions; and
generate a 3-dimensional (3D) model of the hull of the vessel that exists below the waterline based on combining two or more of the multi-dimensional scans,
wherein the one or more hardware processors identify features of the hull of the vessel below the waterline further based on the 3D model.

13. A non-transitory computer readable medium comprising instructions that causes a computer processor to implement a method comprising:
scanning a hull portion of a vessel floating in water using a scanning sensor;
generating a plurality of multi-dimensional scans of the vessel based on data acquired by the scanning sensor;
generating a 3-dimensional (3D) model of the vessel based on the plurality of multi-dimensional scans of the vessel;
analyzing the 3D model of the vessel to identify one or more features on the hull portion of the vessel; and
generating docking information for dry docking the vessel based on the analyzing.

14. The non-transitory computer readable medium of claim 13, wherein the docking information comprises one or more of a docking plan, a docking feasibility, one or more hydrostatic curves, one or more cross curves of stability, a blocking plan, a pumping plan, or one or more vessel drawings that aids in the dry docking of the vessel.

15. The non-transitory computer readable medium of claim 13, wherein the method further comprises generating a blocking plan based on the docking information for dry docking and details of one or more of blocks, cradles, shores, or other vessel support systems used to support the vessel.

16. The non-transitory computer readable medium of claim 15, wherein the generating the docking information for dry docking and the generating the blocking plan comprise identifying locations, quantities, and dimensions of the one or more hull openings and hull appendages on the hull portion and accounting for the locations, quantities, and dimensions of the one or more hull openings in generating the docking plan and the blocking plan for the vessel.

17. The non-transitory computer readable medium of claim 13, wherein the scanning sensor is a contact sensor.

18. The non-transitory computer readable medium of claim 13, wherein the scanning sensor is a non-contact sensor.

19. The non-transitory computer readable medium of claim 13, wherein the one or more features of the hull comprise a hull opening.

20. The non-transitory computer readable medium of claim 13, wherein the one or more features of the hull comprise a hull appendage.

* * * * *